(12) United States Patent
Kurabayashi et al.

(10) Patent No.: US 9,124,730 B2
(45) Date of Patent: Sep. 1, 2015

(54) AUTOMATIC PRIVACY MANAGEMENT FOR IMAGE SHARING NETWORKS

(75) Inventors: Shuichi Kurabayashi, Fujisawa (JP); Naofumi Yoshida, Yokohama (JP); Kosuke Takano, Fujisawa (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 13/519,303

(22) PCT Filed: Dec. 16, 2011

(86) PCT No.: PCT/US2011/065575
§ 371 (c)(1),
(2), (4) Date: Jun. 26, 2012

(87) PCT Pub. No.: WO2013/089785
PCT Pub. Date: Jun. 20, 2013

(65) Prior Publication Data
US 2013/0156331 A1    Jun. 20, 2013

(51) Int. Cl.
*G06K 9/62* (2006.01)
*H04N 1/00* (2006.01)
*G06K 9/00* (2006.01)
*G06K 9/03* (2006.01)
*G06K 9/22* (2006.01)
*H04N 1/44* (2006.01)

(52) U.S. Cl.
CPC ........ *H04N 1/00167* (2013.01); *G06K 9/00228* (2013.01); *G06K 9/036* (2013.01); *G06K 9/228* (2013.01); *H04N 1/00159* (2013.01); *H04N 1/448* (2013.01); *H04N 2201/3215* (2013.01); *H04N 2201/3253* (2013.01); *H04N 2201/3278* (2013.01)

(58) Field of Classification Search
None
See application file for complete search history.

(56) References Cited

U.S. PATENT DOCUMENTS

| | | | |
|---|---|---|---|
| 7,783,135 B2* | 8/2010 | Gokturk et al. | 382/305 |
| 7,797,740 B2* | 9/2010 | Blom et al. | 726/21 |
| 2003/0186708 A1* | 10/2003 | Parulski et al. | 455/456.1 |
| 2004/0070678 A1* | 4/2004 | Toyama et al. | 348/231.3 |
| 2005/0198031 A1* | 9/2005 | Pezaris et al. | 707/9 |
| 2005/0209999 A1* | 9/2005 | Jou | 707/2 |

(Continued)

FOREIGN PATENT DOCUMENTS

| | | | |
|---|---|---|---|
| JP | 2004-326192 A | 11/2004 | |
| JP | 2005-110004 A | 4/2005 | |

(Continued)

OTHER PUBLICATIONS

International Search Report and Written Opinion of the International Searching Authority dated Apr. 19, 2012 as received in application No. PCT/US2011/065575.

*Primary Examiner* — Sumati Lefkowitz
*Assistant Examiner* — Carol Wang
(74) *Attorney, Agent, or Firm* — Maschoff Brennan (57) ABSTRACT

In some examples, a method for managing a captured image is described. The method may include receiving image data that includes image location data regarding where an image is captured. The method may also include receiving device data from a device. The device data may include device location data. The method may also include correlating the device data with the image data. The method may also include modifying the image based on the correlation of the device data and the image data.

17 Claims, 5 Drawing Sheets

(56) References Cited

U.S. PATENT DOCUMENTS

| | | |
|---|---|---|
| 2006/0285150 A1* | 12/2006 | Jung et al. ............... 358/1.15 |
| 2007/0081744 A1* | 4/2007 | Gokturk et al. ............ 382/305 |
| 2007/0098303 A1 | 5/2007 | Gallagher et al. |
| 2008/0303901 A1 | 12/2008 | Variyath et al. |
| 2009/0028434 A1 | 1/2009 | Vanhoucke et al. |
| 2009/0030985 A1* | 1/2009 | Yuan ............... 709/204 |
| 2009/0201310 A1* | 8/2009 | Weiss ............... 345/594 |
| 2010/0050090 A1* | 2/2010 | Leebow ............... 715/751 |
| 2010/0125603 A1* | 5/2010 | Lehikoinen et al. ....... 707/783 |
| 2010/0217794 A1* | 8/2010 | Strandell et al. ......... 709/203 |
| 2010/0287611 A1 | 11/2010 | Blom et al. |
| 2011/0026853 A1 | 2/2011 | Gokturk et al. |
| 2011/0129120 A1 | 6/2011 | Chan |
| 2011/0202968 A1 | 8/2011 | Nurmi |
| 2011/0224978 A1 | 9/2011 | Sawada |
| 2011/0292230 A1 | 12/2011 | Winters |
| 2012/0250951 A1* | 10/2012 | Chen ............... 382/118 |

FOREIGN PATENT DOCUMENTS

| | | |
|---|---|---|
| JP | 2005-130463 A | 5/2005 |
| JP | 2006-033273 A | 2/2006 |
| JP | 2007-295034 A | 11/2007 |
| JP | 2009-093294 A | 4/2009 |
| JP | 2009-522679 A | 6/2009 |
| JP | 2009-265885 A | 11/2009 |
| JP | 2010-122733 A | 6/2010 |
| JP | 2011-155385 A | 8/2011 |
| WO | 2011-051091 A1 | 5/2011 |

* cited by examiner

AUTOMATIC PRIVACY MANAGEMENT FOR IMAGE SHARING NETWORKS

CROSS-REFERENCE TO RELATED APPLICATIONS

This Application is a U.S. National Stage Application filing under 35 U.S.C. §371 claiming the benefit of International Application No. PCT/US2011/65575, filed on Dec. 16, 2011.

Unless otherwise indicated herein, the materials described herein are not prior art to the claims in the present application and are not admitted to be prior art by inclusion in this section.

Image sharing services may provide users with the ability to uploaded images, such as pictures and videos, to a network cloud that hosts the images. Once on the network cloud, the images may be made publically available to allow a user of the service to share the image with his or her friends, associates, and others. Image sharing services, however, do not provide any mechanism for protecting the privacy of people that are in the publically shared images. In particular, image sharing services do not provide a mechanism for protecting the privacy of people who did not consent to their images being captured. Furthermore, image sharing services do not provide users with a tool to manage their images to protect the privacy of third parties that they capture in images. Instead, users of an image sharing service may protect the privacy of third parties by manually reviewing each image to ensure that third party images are not publically shared on the image sharing service.

SUMMARY

Techniques described herein generally relate to the management of images in an image sharing network.

In some examples, a method for managing a captured image is described. The method may include receiving image data that includes image location data regarding where an image is captured. The method may also include receiving device data from a device. The device data may include device location data. The method may also include correlating the device data with the image data. The method may also include modifying the image based on the correlation of the device data and the image data.

In some examples, a method for managing a captured image is described. The method may include receiving image data that includes image location data regarding where an image is captured. The method may also include receiving device data from a device. The device data may include device location data. The method may also include correlating the device data with the image data. The method may also include calculating a probability that a user of the device appears in the image based on the correlation of the device data with the image data.

In some examples, a system is described that may include a data correlator and an image modifier. The data correlator may be configured to correlate image data with device data. The image data may include image location data regarding where an image is captured and the device data may include device location data regarding a location of a device. The image modifier may be configured to modify the image based on the correlation of the image location data and the device location data.

In some examples, a system is described that may include a data correlator and a calculation unit. The data correlator may be configured to correlate image data with device data. The image data may include image location data regarding where an image is captured and the device data may include device location data regarding a location of a device. The calculation unit may be configured to calculate a probability that a user of the device appears in the image based on the correlation of the device data with the image data.

In some examples, a computer-readable storage medium is described whose contents, when executed by a processor, may cause the processor to receive image data that includes image location data regarding where an image is captured. Execution of the contents may also cause the processor to receive device data from a device. The device data may include device location data. Execution of the contents may also cause the processor to correlate the device data with the image data. Execution of the contents may also cause the processor to modify the image based on the correlation of the device data and the image data.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Some embodiments described herein generally relate to cloud based image sharing networks or services and the ability to maintain the privacy of third parties captured in images shared on the image sharing networks. For example, an image sharing network may maintain the privacy of a person that is unintentionally photographed by obscuring the face of the person in the picture.

Generally, for example, the image sharing network may receive an image, such as a photograph or a video, from a user of the image sharing network. The image may contain image location data, such as information concerning when and where the image was taken. The image sharing network may also receive location data from third parties that have registered with the image sharing service to have their privacy protected. The location data may include when the third parties were at specific locations. In some embodiments, the location data from the third parties may be sent to the image sharing network from mobile communication devices, such as smart phones, that are associated with the third parties.

The image sharing network may correlate the location data of the third parties with the image location data to determine the probability that one or more of the third parties was captured in an image. If the image sharing network determines that one or more third parties was captured in the image, the image may be modified to protect the privacy of the third parties. In some embodiments, the image may be modified by obscuring the face of a third party in the image, removing the face of the third party in the image, or by marking the image as private so that the image is not publically shared on the image sharing service. In some embodiments, the image sharing network may determine if the third party knows the user that uploaded the image. If the third party knows the user, the image sharing network may determine that the third party was the subject of the image and not modify the image.

Figure 1:
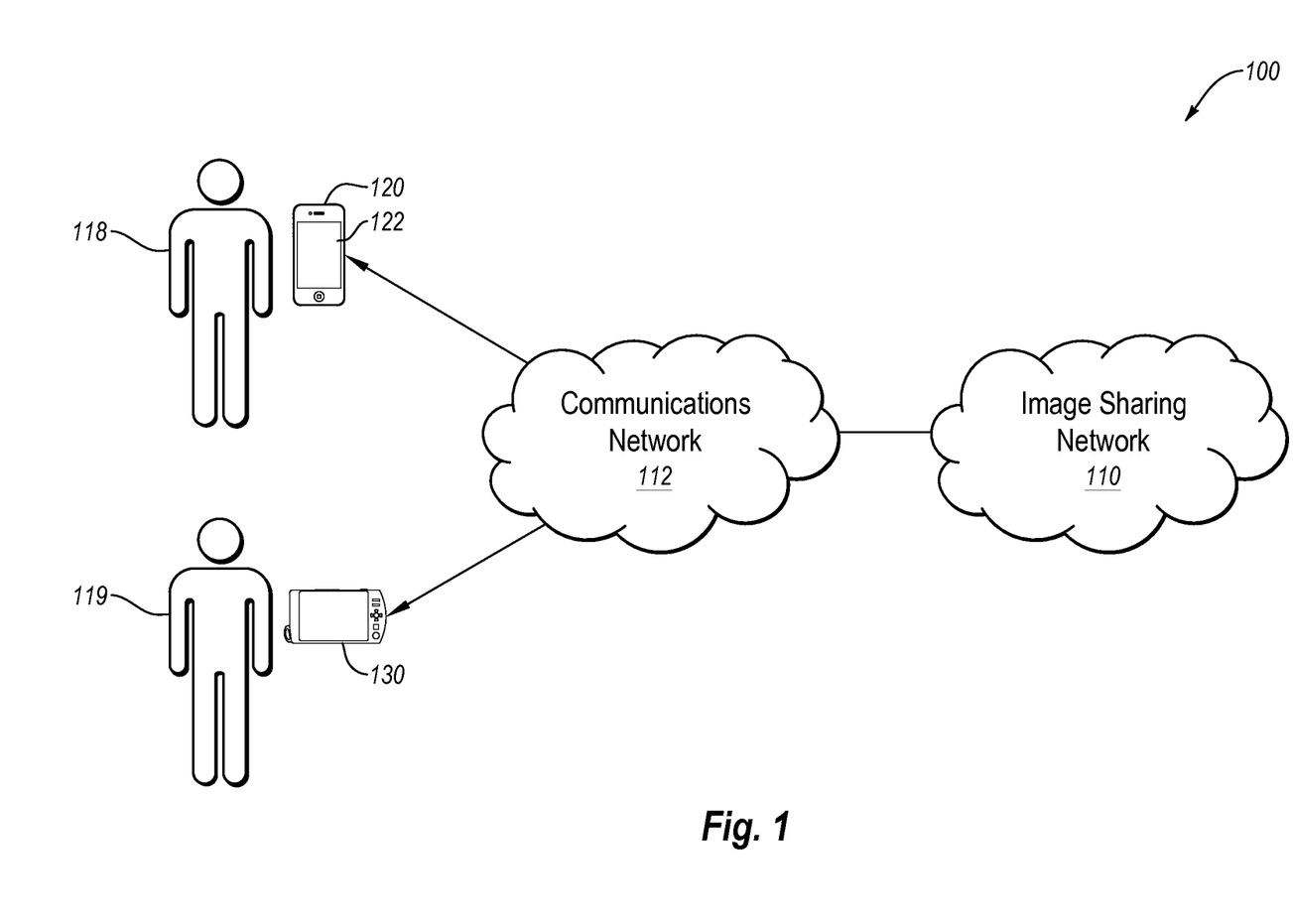
FIG. 1 is a block diagram of an example image management system.

FIG. 1 is a block diagram of an example image management system 100, arranged in accordance with at least some embodiments described herein. In the illustrated embodiment, the image management system 100 may include an image sharing network 110, a communications network 112, a mobile device 120, and an image capture device 130.

In general, the communications network 112 may include one or more wide area networks (WANs) and/or local area networks (LANs) that enable the mobile device 120 and the image capture device 130 to communicate with the image sharing network 110. In some embodiments, the communications network 112 may include the Internet, including a global internetwork formed by logical and physical connections between multiple WANs and/or LANs. Alternately or additionally, the communications network 112 may include one or more cellular RF networks and/or one or more wired and/or wireless networks such as, but not limited to, 802.xx networks, Bluetooth access points, wireless access points, IP-based networks, or the like. The communications network 112 may also include servers that enable one type of network to interface with another type of network.

The image sharing network 110 may be configured to store and share images uploaded to the image sharing network 110 by users of the image sharing network 110. The image sharing network 110 may store images such as photographs. The photographs may be stored in different file formats, including but not limited to, JPEG, TIFF, Exif, RAW, PNG, GIF, BMP, WEBP, PPM, PGM, PBM, and PNM. The image sharing network 110 may also store images such as videos. The videos may be stored in different file formats, including but not limited to, DV and MP4. As will be described in greater detail below, the image sharing network 110 may be configured to, among other things, modify images to maintain the privacy of third parties captured in images shared on the image sharing network 110.

The image sharing network 110 may receive images from image capturing devices, such as the image capture device 130. The image capture device 130 may capture images and upload the images through the communications network 112 to the image sharing network 110. The image capture device 130 may also create data about the images that are uploaded to the communications network 112. For example, the image capture device 130 may create image data for each image that may include, but is not limited to, a location where the image is captured and the time the image is captured. The image capture device 130 may determine the location where the image is captured using GPS, wireless networks, wired networks, or by receiving location data from an image capturing party 119. For example, in some embodiments, the location of the image capture device 130 may be determined based on signal strengths from surrounding mobile phone base stations. In some embodiments, the image data may be embedded in the image as metadata and uploaded with the image to the image capture device 130. In some embodiments, the image data may be separate from the image and may be uploaded to the image sharing network 110 separately from the image.

The image capture device 130 may be solely an image capturing device, such as a digital camera or digital camcorder. In some embodiments, the image capture device 130 may be included in another device, including, but not limited to, a mobile communications device, such as a mobile phone or a smart phone, a gaming system, a personal digital assistant (PDA), a laptop computer, a desktop computer, a handheld electronic device, or a tablet computer, or the like.

In some embodiments, the image capture device 130 may not communicate with the image sharing network 110 through the communications network 112. The image capture device 130 may download images and the image data to a secondary device (not shown), such as a personal computer, a laptop computer, a tablet computer, or other electronic device. The secondary device may upload the images and the image data through the communications network 112 to the image sharing network 110. In some embodiments, the image capture device 130 may not generate image data. The secondary device may generate the image data and upload the image data with the images from the image capture device 130 to the image sharing network 110.

The image sharing network 110 may also receive data from devices, such as the mobile device 120. The mobile device 120 may include a device data generator 122 that may be configured to, among other things, run one or more applications that interface with the image sharing network 110 and generate and send device data to the image sharing network 110 through the communications network 112. The device data may include, but is not limited to, the location of the mobile device 120 and the time that the mobile device 120 is in the location. For example, the device data may indicate that the mobile device 120 is at a certain longitude and latitude at a certain time.

In some embodiments, the device data generator 122 may determine the location of the mobile device 120 using GPS. Alternately or additionally, the device data generator 122 may determine the location of the mobile device 120 using one or more wireless or wired networks or using any other means to determine its location. For example, in some embodiments, the location of the device 120 may be determined based on signal strengths from surrounding base stations of a mobile communication network. Furthermore, in some embodiments, the device data generator 122 may generate additional device data to send the image sharing network 110 every time the device data generator 122 determines that the mobile device 120 has moved to a new location. Alternately or additionally, the device data generator 122 may periodically generate additional device data at a set interval or intervals of time, for example, every 1 minute, 2 minutes, 5 minutes, or other time interval. Alternately or additionally, the device data generator 122 may monitor the location of the mobile device 120 and generate additional device data after the mobile device 120 moves a predetermined distance from an immediately preceding reported location.

In some embodiments, the device data generator 122 may send device information in real-time. Alternately or additionally, the device data generator 122 may store the device information and send the device information at a lower frequency, such as every hour, every two hours, every twelve hours, or once per day. In some embodiments, the device data generator 122 may automatically send device data to the image sharing network 110. Alternately or additionally, the device data generator 122 may send the device data to the image sharing network 110 as requested by a third party 118 owner of the mobile device 120.

The mobile device 120 may be any electronic device capable of generating location and time data. For example, in some embodiments, the mobile device 120 may include, but is not limited to, a mobile communication device, such as mobile phone or smart phone, tablet, GPS navigation system device, gaming system, media player, or other electronic device capable of determining its location. In some embodiments, the mobile device 120 may not communicate with the image sharing network 110 through the communications network 112. For example, the device data generator 122 may generate the device data and download the device data to a secondary device (not shown), such as personal computer, laptop, mobile communication device, tablet, or other electronic device that may upload the device data to the image sharing network 110.

The device data received from the mobile device 120 allows the image sharing network 110 to determine the current and past locations of the third party 118 owner of the mobile device 120 and the time that the third party 118 was at those locations. As will be described in greater detail below, using the device data received from the mobile device 120 and the image data received from the image capture device 130, the image sharing network 110 may determine the probability that the third party 118 was captured in an image taken by the image capturing party 119 using the image capture device 130. Based on this determination, in some embodiments, the image sharing network 110 may modify the image to prevent the image of the third party 118 from being publicly displayed by the image sharing network 110. In some embodiments, the third party 118 owner of the mobile device 120 may turn-off the device data generator 122 so that no device data is generated or sent to the image sharing network 110. If no device data is generated, the image sharing network 110 may not prevent the image of the third party 118 from being publicly displayed by the image sharing network 110.

Figure 2:
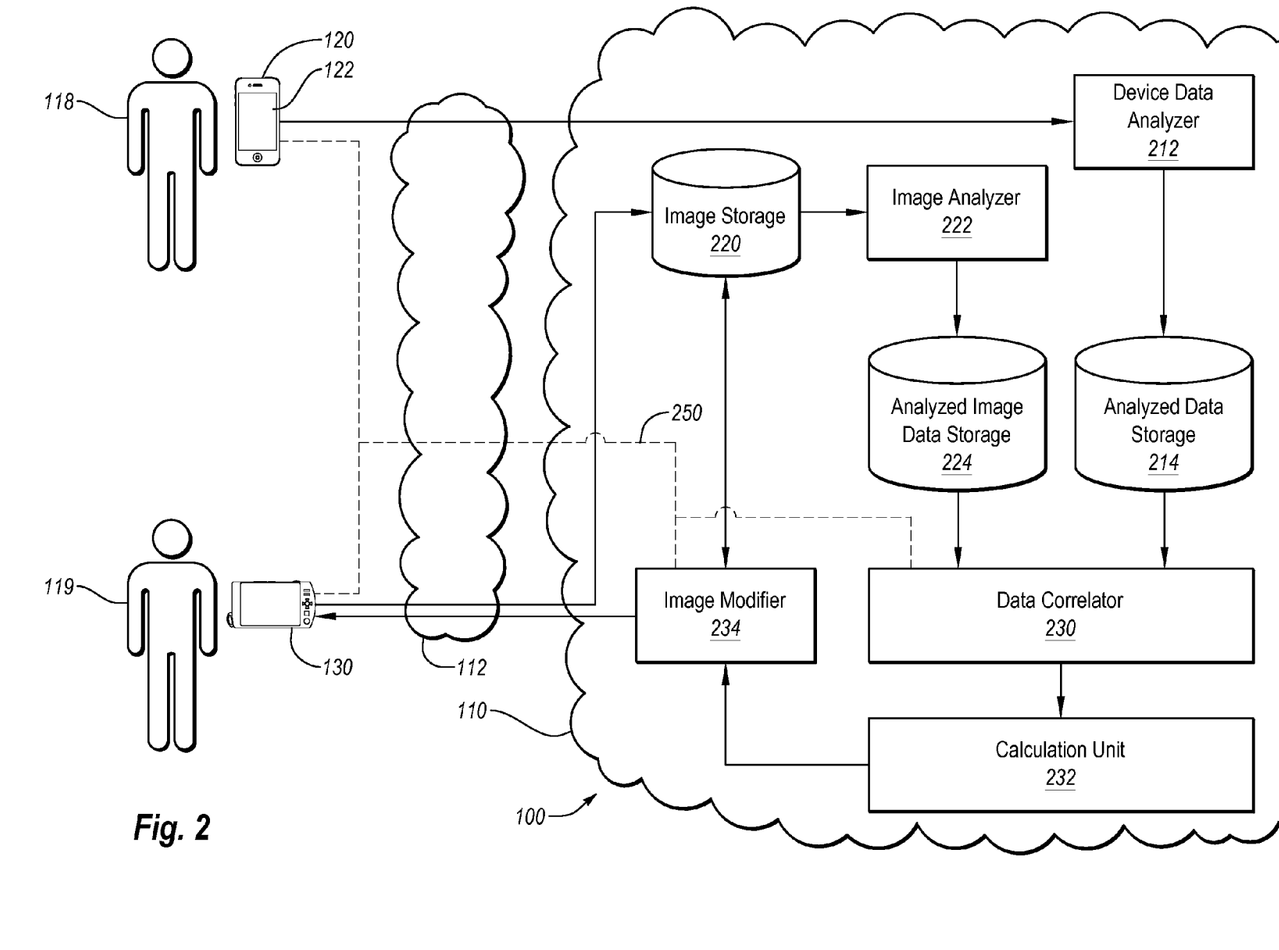
FIG. 2 is a block diagram illustrating components of an image sharing network within the example image management system illustrated in FIG. 1.

FIG. 2 is a block diagram illustrating components of the image sharing network 110 within the image management system 100 illustrated in FIG. 1, arranged in accordance with at least some embodiments described herein. As illustrated, the image sharing network 110 may include a device data analyzer 212, an analyzed data storage 214, an image storage 220, an image analyzer 222, an analyzed image data storage 224, a data correlator 230, a calculation unit 232, and an image modifier 234. In some embodiments, the analyzed data storage 214, the image storage 220, and the analyzed image data storage 224 may each include non-transitory computer readable storage media and/or may each represent logical partitions in the same or different non-transitory computer-readable storage media. Each of the device data analyzer 212, the image analyzer 222, the data correlator 230, the calculation unit 232 and the image modifier 234 may be implemented in hardware, software, or a combination of both hardware and software. Alternately or additionally, although the image sharing network 110 is illustrated as having various discrete components, various components may be divided into additional components, combined into fewer components, or eliminated, depending on the desired implementation.

The device data analyzer 212 may be configured to receive device data from the device data generator 122 of the mobile device 120. The device data analyzer 212 may alternately or additionally be configured to calculate a movement path of the mobile device 120 using the device data. In some embodiments, the device data received by the image sharing network 110 may represent the location of the mobile device 120 at different intervals of time. For example, the device data may include the location of the mobile device 120 at time A and the location of the mobile device 120 at time B, but not the location of the mobile device 120 during the period between time A and time B. For example, if the mobile device 120 is moving, and the device data generator 122 is generating device data every one minute, then the location of the mobile device 120 between location data points in the device data may not be included in the device data. In at least these instances, the device data analyzer 212 may interpolate the location of the mobile device 120 at one or more time frames based on the device data provided by the mobile device 120.

In some embodiments, the device data analyzer 212 may interpolate the location of the device at one or more times frames using road information. The device data analyzer 212 may obtain road information from one or more sources, including the Geographic Information System's road information. The device data analyzer 212 may search the nearest and shortest combination of roads to link two locations from the device data. Using this information, the device data analyzer 212 may interpolate the location of the mobile device 120 at time frames between the data points provided by the mobile device 120. For example, if the mobile device 120 was generating device data every T seconds and at time A was at point D and at time C was at point F, the device data analyzer 212 may interpolate that at time B, which occurred after time A and before time C, that the mobile device 120 may be positioned at point E between points D and F.

In some embodiments, the device data analyzer 212 may also divide the Earth using a grid pattern to create device location cells and place the device data points and interpolated device data points into their appropriate device location cells. In this data structure, each device location cell may correspond to a specific area in the real world. The mobile device 120 may thus be associated with device locations cells that contain the locations traversed by the mobile device 120. The device location cells may be determined based on one or more of longitude and latitude, geographic boundaries, streets, civil boundaries, or other factors. Furthermore, the size of the device location cells may vary and depend upon one or more factors, such as, but not limited to, desired resolution, memory constraints, processing power, and other factors. The device data received from the mobile device 120 and any interpolated device data may be stored in the analyzed data storage 214 for later use. The device data and the interpolated device data may be stored according to their associated device location cells in some embodiments.

The image sharing network 110 may also be configured to receive images from the image capture device 130 and to store the images in the image storage 220. The image sharing network 110 may also be configured to receive the image data from the image capture device 130. As noted above, in some embodiments, the image data may be embedded as part of the image. In these embodiments and others, the image may be sent to the image analyzer 222 to extract the image data from the image. In some embodiments, the images are analyzed by the image analyzer 222 before the images are stored in the image storage 220. In some embodiments, the images are stored in the image storage 220 and later accessed and analyzed by the image analyzer 222 to extract the image data.

The image data, whether extracted from the image or received independently from the image capture device 130, may be analyzed. In some embodiments, the image analyzer 222 may divide the Earth using a grid pattern to create image location cells and place an image into specific image locations cells based on the location data within the image data. In this data structure, each image location cell may correspond to a specific area in real space. The image may thus be associated with an image location cell that contains the location where the image was captured. For example, in some embodiments, an image location cell may be four city blocks. If the image is captured within those four city blocks, the image may be linked with that image location cell. The image location cells may be determined based on one or more of longitude and latitude, geographic boundaries, streets, civil boundaries, or other factors. Furthermore, the size of the image location cells may vary and depend upon one or more factors, such as, but not limited to, desired resolution, memory constraints, processing power, and other factors. The image location cells may be similar in size to the locations cells used by the device data analyzer 212 to analyze device data in some embodiments.

The analyzed image data storage 224 may store the image data, including the image location and image time. In some embodiments, the image data may be stored in the analyzed image data storage 224 according to the image location cell associated with the image data.

The data correlator 230 may be configured to correlate the device data stored in the analyzed data storage 214 with the image data stored in the analyzed image data storage 224 by comparing the device data and the image data to determine instances where an image is captured in a location at the approximate time that the mobile device 120 is in the same approximate location. The data correlator 230 may correlate the device data and image data using any known algorithm. In some embodiments, where the image data is associated with an image location cell, the data correlator 230 may determine if the mobile device 120 traversed or was otherwise within the image location cell and the approximate time that the mobile device 120 traversed or was otherwise within the image location cell to correlate the device data with the image data. In some embodiments, where the image data is associated with an image location cell and the device data is associated with device location cells, the data correlator 230 may determine if the device location cells traversed by the mobile device 120 are the same as or near the image location cell that is associated with the image. If the device location cells and image location cell match, overlap, or are closely related, the data correlator 230 may determine if the time data associated with device location cells and image location cell match, overlap, or are closely related to determine a correlation between the device data and the image data.

In some embodiments, if the time data and the location data of the device data and image data correspond, the data correlator 230 may determine if the image capturing party 119 is known to the third party 118 owner of the mobile device 120. If the data correlator 230 determines that the image capturing party 119 is known to the third party 118, the data correlator 230 may determine the third party 118 consented to any images captured by the image capturing party 119. As a result, the image sharing network 110 may not modify the image.

The data correlator 230 may determine if the image capturing party 119 is known to the third party 118 by comparing the name information associated with the image with a list of people associated with the third party 118. For example, in some embodiments, the image sharing network 110 may associate uploaded images with the name of the image capturing party 119 that uploaded the image. The third party 118 may also provide a list of associates to the image sharing network 110. The data correlator 230 may use the list of associates and the associated name to determine if the third party 118 knows the image capturing party 119. In some embodiments, the third party 118 may grant the image sharing network 110 access to social networks in which the third party 118 participates, and the image sharing network 110 may generate a list of associates based on the social network connections of the third party 118.

If a correlation exists between the device data and the image data, the data correlator 230 may be configured to pass the image data and the device data to the calculation unit 232. The calculation unit 232 may be configured to calculate the probability that the third party 118 was captured in the image associated with the image data. The calculation unit 232 may calculate the probability based on one or more factors, such as, but not limited to, the strength of the correlation between the device data and the image data, terrain where the image was captured, and other factors. If the probability is above a predetermined threshold, the calculation unit 232 may be configured to indicate that the image may present a privacy concern for the third party 118.

In some embodiments, the predetermined threshold may be determined by the image sharing network 110. Alternately or additionally, the third party 118 may determine the predetermined threshold according to the third party's 118 privacy desires. Alternately or additionally, the image capturing party 119 may determine a predetermined threshold according to the image capturing party's 119 privacy desires. In some embodiments, the third party 118 and/or the image capturing party 119 may communicate with the data correlator 230 to send a predetermined privacy threshold by way of a communication line 250. If more than one party has set a predetermined threshold, the image sharing network 110 may use the lowest value, highest value, mean value, median value, or some other variation thereof.

The image modifier 234 may be configured to modify an image if the probability that the third party was captured by the image associated with the image data is above the predetermined threshold. In some embodiments, before modifying the image, the image modifier 234 may send a notification to the image capturing party 119 that the image may have captured a third party. The notification may be sent to the image capturing party 119 through the image capture device 130 or through some other electronic device associated with the image capturing party 119, and/or to an email address, phone number, or other address associated with the image capturing party 119. The notification may request that the image capturing party 119 signify that he or she understands that a third party may have been captured by the image and may ask the image capturing party 119 to not share the image. In some embodiments, the image modifier 234 may modify the image and then send a notification to the image capturing party 119 that the image was modified because it may have captured the image of a third party.

In some embodiments, the image modifier 234 may be configured to access the image in the image storage 270 and to modify the image by obscuring all or some of the faces in the image. In some embodiments, the faces of the image may be obscured by performing mosaic processing. In some embodiments, the image modifier 234 may access the image in the image storage 270 and modify the image by removing the faces in the image or by labeling the image as private to prevent the public display of the image.

In some embodiments, the image modifier 234 may only obscure or remove the face of the third party 118. The third party 118 may submit an image of the third party's 118 face to the image modifier 234 by way of the communication line 250. The image modifier 234 may identify the face of the third party 118 within the image based on the image submitted by the third party 118 and only obscure or remove the face of the third party 118.

In some embodiments, a manner in which the image is modified may depend on the probability that the image captured a third party. For example, in some embodiments, an image with a lower probability may be modified by obscuring the face of the image and an image with a higher probability may be modified by marking the image as private and preventing the image from being shared. In some embodiments, the image modifier 234 may modify a copy of the image that may be shown publicly. The original image may be maintained unmodified and private.

In some embodiments, various components of the image sharing networking 110 may be located on another network or joined with another device. For example, in some embodiments, the image storage 220 may be part of another network that communicates with the image sharing network 110. The image capture device 130 may send the image and the image data to the image analyzer 222 in the image sharing network 110. The image analyzer 222 may analyze the image and send the image to the image storage 220 on the other network. In some embodiments, the image capture device 130 may send the image directly to the image storage 220 on the other network and send the image data to the image analyzer 222 for analysis. Having the image storage 220 on another network may allow for an image sharing service to divide the resources that handle image sharing and the resources that handle privacy maintenance of third parties.

As another example, in some embodiments, the image capture device 130 may maintain the image and only send the image data to the image analyzer 222. If the image sharing network 110 determined that the image needed to be modified, the image modifier 234 may send a request to the image capture device 130 to modify the image appropriately. As another example, in some embodiments, the mobile device 120 may include the device data analyzer 212 and analyzed data storage 214. The mobile device 120 may send the analyzed data directly to the data correlator 230 for correlating the device data with the image data.

As another example, in some embodiments, the image sharing network 110 may contain only the image storage 220, the data correlator 230, the calculation unit 232, and the image modifier 234. The mobile device 120 may contain the device data generator 122, device data analyzer 212, and the analyzed data storage 214. The image capture device 130 may contain the image analyzer 222 and the analyzed image data storage 224. The image sharing network 110 may receive the analyzed image and device data from the image capture device 130 and the mobile device 120 respectively, correlate the image and device data, and modify the image appropriately as needed.

In some embodiments, the device data generated by the device data generator 122 and the image data may not be analyzed. The raw device data and image data may be received by the image sharing network 110 and correlated by the data correlator 230. In these embodiments and others, the image sharing network 110 may not contain the device data analyzer 212 or the image analyzer 222. One skilled in the art will appreciate that various other configurations and combinations of the components described above with respect to FIGS. 1 and 2 may exist without detracting from the essence of the disclosed embodiments.

Figure 3:
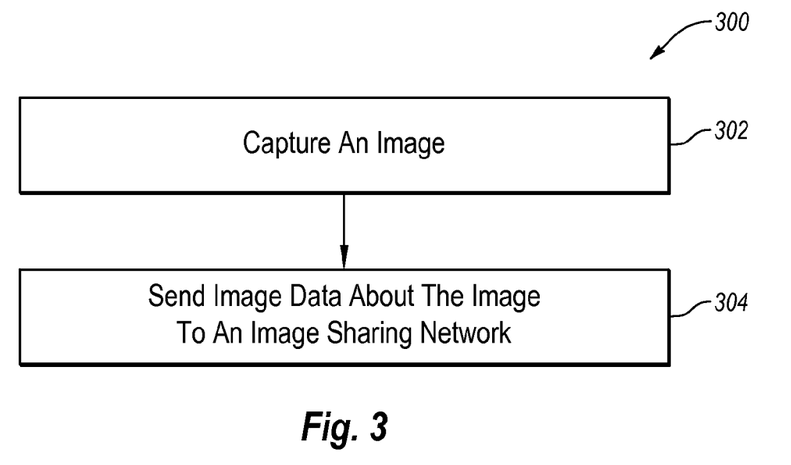
FIG. 3 shows an example flow diagram of a method that may be implemented in the image management system of FIGS. 1 and 2.

FIG. 3 shows an example flow diagram of a method 300 that may be implemented in the image management system 100 of FIGS. 1 and 2, arranged in accordance with at least some embodiments described herein. The method 300 includes various operations, functions, or actions as illustrated by one or more of blocks 302 and/or 304. The method 300 may begin at block 302.

In block 302, an image capture device, for example, the image capture device 130 illustrated in FIGS. 1 and 2, may capture an image. The image capture device may also generate image data that may include, but not be limited to, location data indicating where the image was captured, time data indicating when the image was captured, and capturing data indicating the party that owns or operates or is otherwise associated with the image capture device. In some embodiments, the image data may be input by a party that owns or operates or is otherwise associated with the image capture device. In some embodiments, the image data may be separate from or embedded in the image. Block 302 may be followed by block 304.

In block 304, the image capture device may send the image data to an image sharing network, such as the image sharing network 110 illustrated in FIGS. 1 and 2. In some embodiments, the image capture device may also send the image to the image sharing network.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
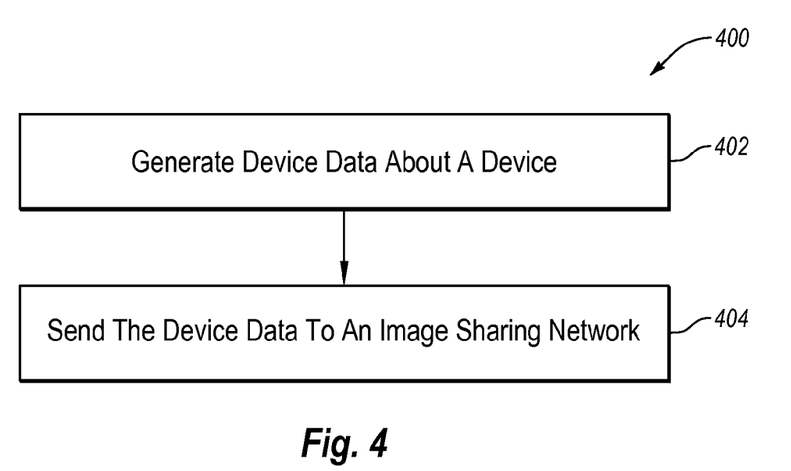
FIG. 4 shows an example flow diagram of a method that may be implemented in the image management system of FIGS. 1 and 2.

FIG. 4 shows an example flow diagram of a method 400 that may be implemented in the image management system 100 of FIGS. 1 and 2, arranged in accordance with at least some embodiments described herein. The method 400 includes various operations, functions, or actions as illustrated by one or more of blocks 402, and/or 404. The method 400 may begin at block 402.

In block 402, a mobile device may generate device data about the mobile device. The mobile device may include the mobile device 120 illustrated in FIGS. 1 and 2, for instance. The device data may include, but not be limited to, location data that may indicate current and/or past locations of the device and time data that may indicate when the device was at the locations. Block 402 may be followed by block 404.

In block 404, the mobile device may send the device data to an image sharing network, such as the image sharing network 110 illustrated in FIGS. 1 and 2.

Figure 5:
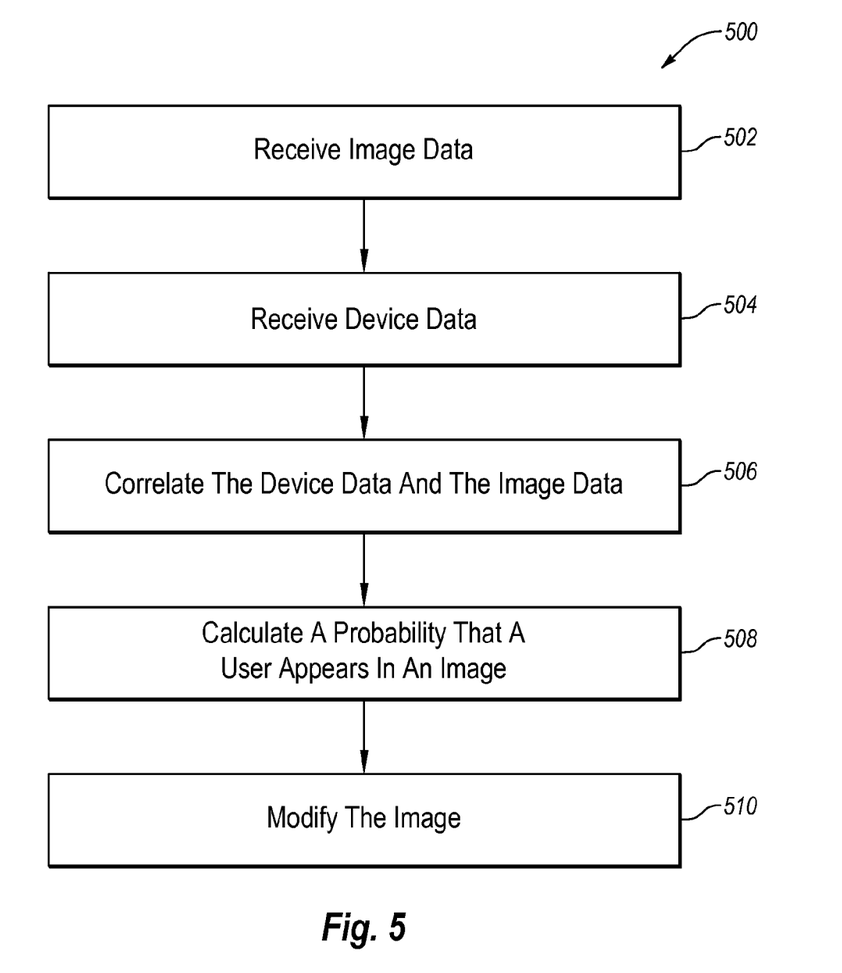
FIG. 5 shows an example flow diagram of a method that may be implemented in the image management system of FIGS. 1 and 2.

FIG. 5 shows an example flow diagram of a method 500 that may be implemented in the image management system 100 of FIGS. 1 and 2, arranged in accordance with at least some embodiments described herein. The method 500 may include various operations, functions or actions as illustrated by one or more of blocks 502, 504, 506, 508, and/or 510. The method 500 may begin at block 502.

In block 502, an image sharing network may receive image data from an image capture device through a communications network. The image capture device may include the image capture device 130 of FIGS. 1 and 2, for instance. The image data may include image location data that may indicate the location where an image was captured. In some embodiments, the image may be a photograph. In some embodiments, the image may be an image from a video. In some embodiments, the image data may also include time data indicating when the image was captured. Block 502 may be followed by block 504.

In block 504, the image sharing network may receive device data from a mobile device separate from the image capture device through the communications network. The mobile device may be the mobile device 120 of FIGS. 1 and 2, for example, and/or may be associated with or owned by a third party, such as the third party 118 of FIGS. 1 and 2. The device data may include device location data that may indicate current and/or past locations of the mobile device. In some embodiments, the device data may also include time data that may indicate when the mobile device was at the locations in the device location data. Block 504 may be followed by block 506.

In block 506, the image data and the device data may be correlated. The image and device data may be correlated by comparing the device location data with the image location data to determine if the image was captured at an approximate location where the device had been located. In some embodiments, the image and device data may be further correlated by comparing the device time data with the image time data to determine if the image was captured in a location at an approximate time that the device was in the same approximate location. A variety of algorithms may be used to correlate the image data with the device data. Block 506 may be followed by block 508.

In block 508, a probability that a user of the device appears in the image captured by the image capture device may be calculated based on the correlation of the device data and the image data. Block 508 may be followed by block 510.

In block 510, the image may be modified if the probability that the user of the mobile device appears in the image is greater than a threshold. The threshold may be predetermined by the image sharing network, an owner of the mobile device, a user of the mobile device a submitter of the image to the image sharing network, or some combination thereof. In some embodiments, the image may be modified by removing the image from the image sharing service. Alternately or additionally, the image may be modified by removing or obscuring the face of a person in the image. Alternately or additionally, the image may be modified by maintaining the image private in the image sharing service.

The outlined steps and operations of FIG. 5 are only provided as examples, and some of the steps and operations may be optional, may be combined into fewer steps and operations, or expanded into additional steps and operations. For instance, in some embodiments, the operation of calculating a probability that a user appears in an image as represented by block 508 may be omitted. Alternately, in some embodiments, the operation of modifying the image as represented by block 510 may be omitted.

Alternately or additionally, the method 500 may further include determining when the user of the mobile device is the subject of the image. Making this determination may include determining the submitter of the image and if the submitter of the image is known to the user of the mobile device. If the user of the mobile device is the subject of the image, then the image may not be modified to protect the privacy of the user of the mobile device. This circumstance may occur when a friend or associate of the user of the mobile device captures an image of the user of the mobile device with consent of the user of the mobile device. In some embodiments, determining if the submitter of the image is known to the user of the mobile device may include determining if the user of the mobile device and the submitter of the image are networked through social media.

In some embodiments, the image sharing network may receive device data intermittently. Likewise, in some embodiments, the device data may only provide intermittent device location. As a result, an approximate location of the device during a time interval between intermittent location data may not be available from the device data. Accordingly, a location of the mobile device may be interpolated based on the device location data received from the mobile device. Interpolating the location of the mobile device may include interpolating a path between two locations of the mobile device provided by the device data. The path may be interpolated using road information or other information.

An example of method 500 is as follows. A person may desire to protect their privacy by not having their image displayed in images found on public image sharing services when the person is not the subject of the image. To protect his or her privacy, the person may provide his or her location data to an image sharing network. A mobile device carried by the person, such as a smart phone, may provide the location of the person to the image sharing service. The image sharing service may store the location data of the person.

The image sharing network may also receive images taken by users of the image sharing service. The images may contain image data, such as where the image was taken and when the image was taken. The image sharing network may store the image data and compare the image data with data from the mobile device of the person to determine if an image was captured at a location where the person was located. If the image was taken where the person was located, the person may have been captured in the image. The image sharing network may determine that the probability that the person was captured in the image is above a predetermined threshold and modify the image. The image may be modified by obscuring the face of the person in the image so that the privacy of the person is protected.

Figure 6:
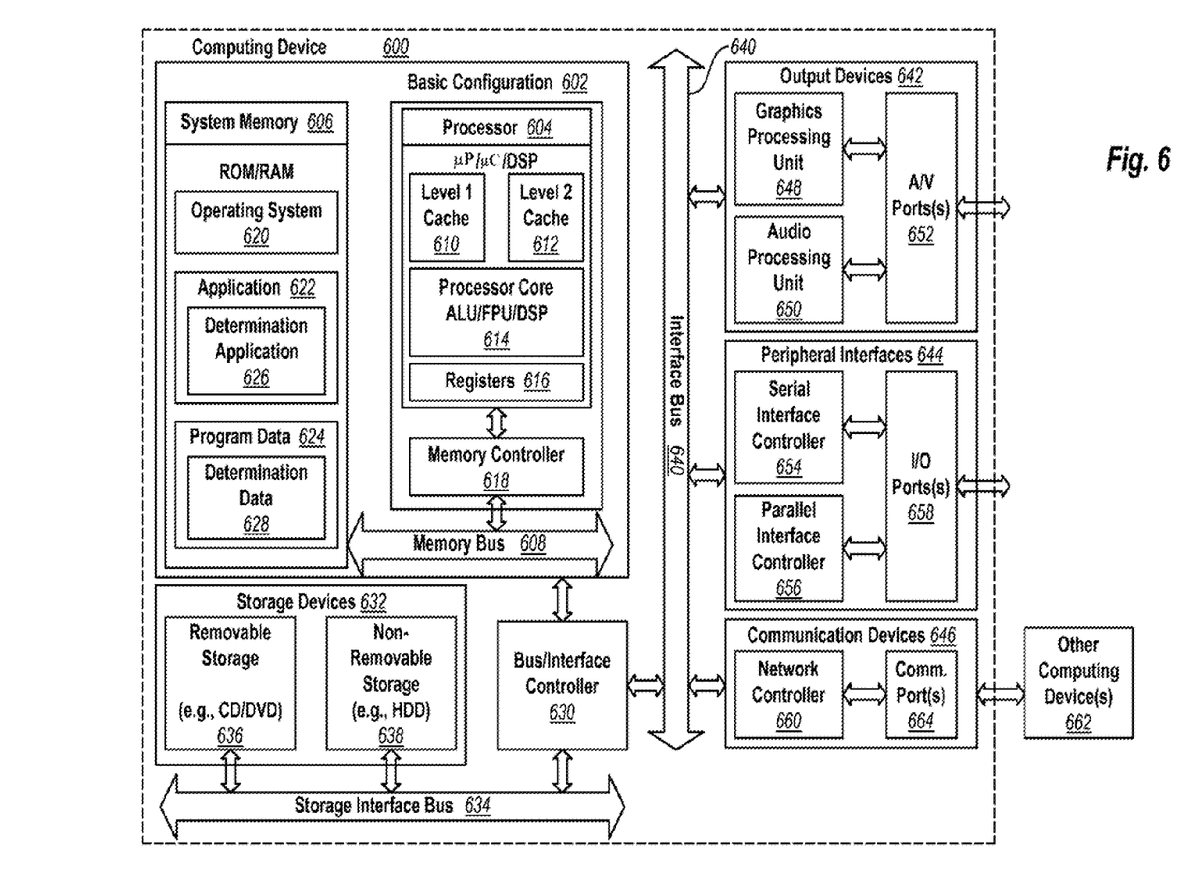
FIG. 6 is a block diagram illustrating an example computing device that is arranged for managing captured images, all arranged in accordance with at least some embodiments described herein.

FIG. 6 is a block diagram illustrating an example computing device 600 that is arranged for managing captured images, in accordance with at least some embodiments described herein. The computing device 600 may be included in any one of the mobile device 120, and/or the image capture device 130, and/or may include any one or more of the device data analyzer 212, the image analyzer 222, the data correlator 230, the calculation unit 232, or the image modifier 234 of FIG. 1 or 2, or both, for example. In a very basic configuration 602, the computing device 600 typically includes one or more processors 604 and a system memory 606. A memory bus 608 may be used for communicating between the processor 604 and the system memory 606.

Depending on the desired configuration, the processor 604 may be of any type including but not limited to a microprocessor (μP), a microcontroller (μC), a digital signal processor (DSP), or any combination thereof. The processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system (OS) 620, one or more applications 622, and program data 624. The application 622 may include a determination application 626, such as correlating algorithm, that is configured to correlate image data and device data as described herein or other algorithms including those described with respect to the methods 300, 400, and 500 of FIGS. 3, 4, and 5. The application 622 may correspond to the data correlator 230 of FIG. 2, for example. The program data 624 may include determination data 628, such as device data, that may be useful for calculating a probability that a user of the device was captured in an image as is described herein. In some embodiments, the application 622 may be arranged to operate with the program data 624 on the OS 620 such that implementations of managing an image sharing network such as described in the method 500 of FIG. 5 may be provided as described herein. This described basic configuration 602 is illustrated in FIG. 6 by those components within the inner dashed line.

The computing device 600 may have additional features or functionality, and additional interfaces to facilitate communications between the basic configuration 602 and any required devices and interfaces. For example, a bus/interface controller 630 may be used to facilitate communications between the basic configuration 602 and one or more data storage devices 632 via a storage interface bus 634. The data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., output devices 642, peripheral interfaces 644, and communication devices 646) to the basic configuration 602 via the bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 600 may also be implemented as a personal computer including both laptop computer and non-laptop computer configurations.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method to manage a captured image, the method comprising:
    receiving image data from an image sending device at an image sharing network, wherein the image data is captured by a first user and comprises image location data regarding where an image is captured;
    receiving device data at the image sharing network from a device of a second user, the device data comprising device location data;
    determining, using at least one processor, a probability that the second user appears in the image based on the device data and the image data;
    in response to the probability that the second user appears in the image being greater than a first threshold, modifying the image by marking the image as private; and
    in response to the probability that the second user appears in the image being greater than a second threshold and less than or equal to the first threshold, modifying the image by obscuring a portion of the image.

2. The method of claim 1, wherein the image comprises a photograph or an image of a video.

3. The method of claim 1, wherein modifying the image by obscuring the portion of the image comprises removing or obscuring a face of a person in the image.

4. The method of claim 3, further comprising sending a notification to the image sending device that sends the image data, the notification indicating that the image was modified.

5. The method of claim 1, wherein determining the probability that the second user appears in the image based on the device data and the image data comprises comparing the device location data with the image location data and device time data with image time data, wherein the device time data represents when the device location data was collected and the image time data represents when the image was captured.

6. The method of claim 1, further comprising interpolating a location of the device using the device location data.

7. The method of claim 1, wherein the device is a mobile communication device.

8. The method of claim 1, further comprising receiving at an image sharing network the image, wherein modifying the image occurs after the image is received at the image sharing network.

9. A method to manage a captured image, the method comprising:
    receiving image data from an image sending device at an image sharing network, wherein the image data is captured by a first user and comprises image location data regarding where an image is captured;
    receiving device data at the image sharing network from a device of a second user, the device data comprising device location data;
    correlating, using at least one processor, the device data with the image data;
    in response to the device data being correlated with the image data:
        calculating a probability that the second user appears in the image based on the correlation of the device data with the image data;
        in response to the probability that the second user appears in the image being greater than a first threshold, modifying the image by marking the image as private; and
        in response to the probability that the second user appears in the image being greater than a second threshold and less than or equal to the first threshold, modifying the image by obscuring a portion of the image.

10. The method of claim 9, wherein in response to the device data being correlated with the image data and the probability that the second user appears in the image being greater than the second threshold and less than or equal to the first threshold, the method further comprises:
sending a notification to the image sending device concerning the probability that the second user appears in the image; and
receiving an indication from the image sending device that acknowledges the probability that the second user appears in the image,
wherein in response to receiving the indication from the image sending device, the image is marked private.

11. The method of claim 9, further comprising determining whether the second user is known to the first user based on the second user and the first user being networked through social media, wherein,
in response to the second user not being known to the first user and the probability that the second user appears in the image being greater than the first threshold, modifying the image by marking the image as private; and
in response to the second user not being known to the first user and the probability that the second user appears in the image being greater than the second threshold and less than or equal to the first threshold, modifying the image by obscuring the portion of the image.

12. The method of claim 11, wherein the image is an original image, wherein in response to the second user not being known to the first user and the probability that the second user appears in the original image being greater than the second threshold and less than or equal to the first threshold, the method further comprises copying the original image to form a copied image before modifying the original image, wherein the copied image is marked private and the original image is modified by obscuring the portion of the original image.

13. A system to manage a captured image, the system comprising:
a data correlator configured to determine a probability that a first user appears in an image based on device data and image data, wherein the image data is captured by a second user, received from an image sending device, and comprises image location data regarding where an image is captured, and the device data is received from a device of the first user and comprises device location data regarding a location of the device; and
an image modifier configured to:
modify the image by marking the image as private when the probability that the first user appears in the image is greater than a first threshold, and
modify the image by obscuring a portion of the image when the probability that the first user appears in the image is greater than a second threshold and less than or equal to the first threshold.

14. The system of claim 13, wherein the image comprises a photograph or an image of a video.

15. The system of claim 13, wherein the image modifier is configured to obscure the portion of the image by removing or obscuring a face of a person in the image.

16. The system of claim 13, further comprising a device data analyzer configured to interpolate an interpolated location of the device at a time the image is captured, wherein the data correlator determines the probability that the first user appears in the image based on a correlation of the image location data with the interpolated location of the device.

17. The system of claim 13, wherein the data correlator is configured to determine the probability that the first user appears in the image based on a correlation of the image location data with the device location data and a correlation of device time data with image time data, wherein the device time data represents when the device location data is collected and the image time data represents when the image is captured.

* * * * *